Sept. 30, 1969　　　　G. G. PROSEN　　　　3,469,522
DEVICE FOR BREWING BEVERAGE
Filed Feb. 16, 1967
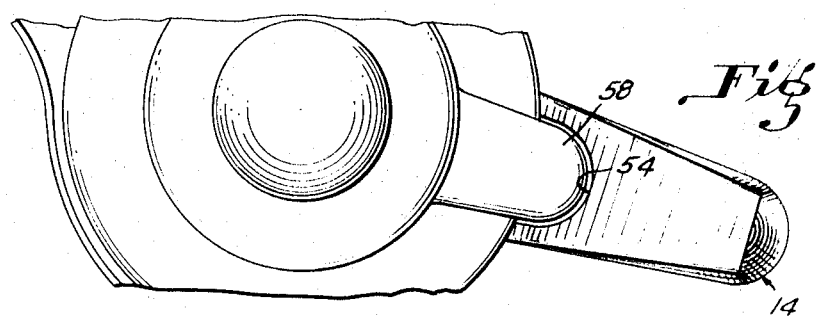
Fig. 2
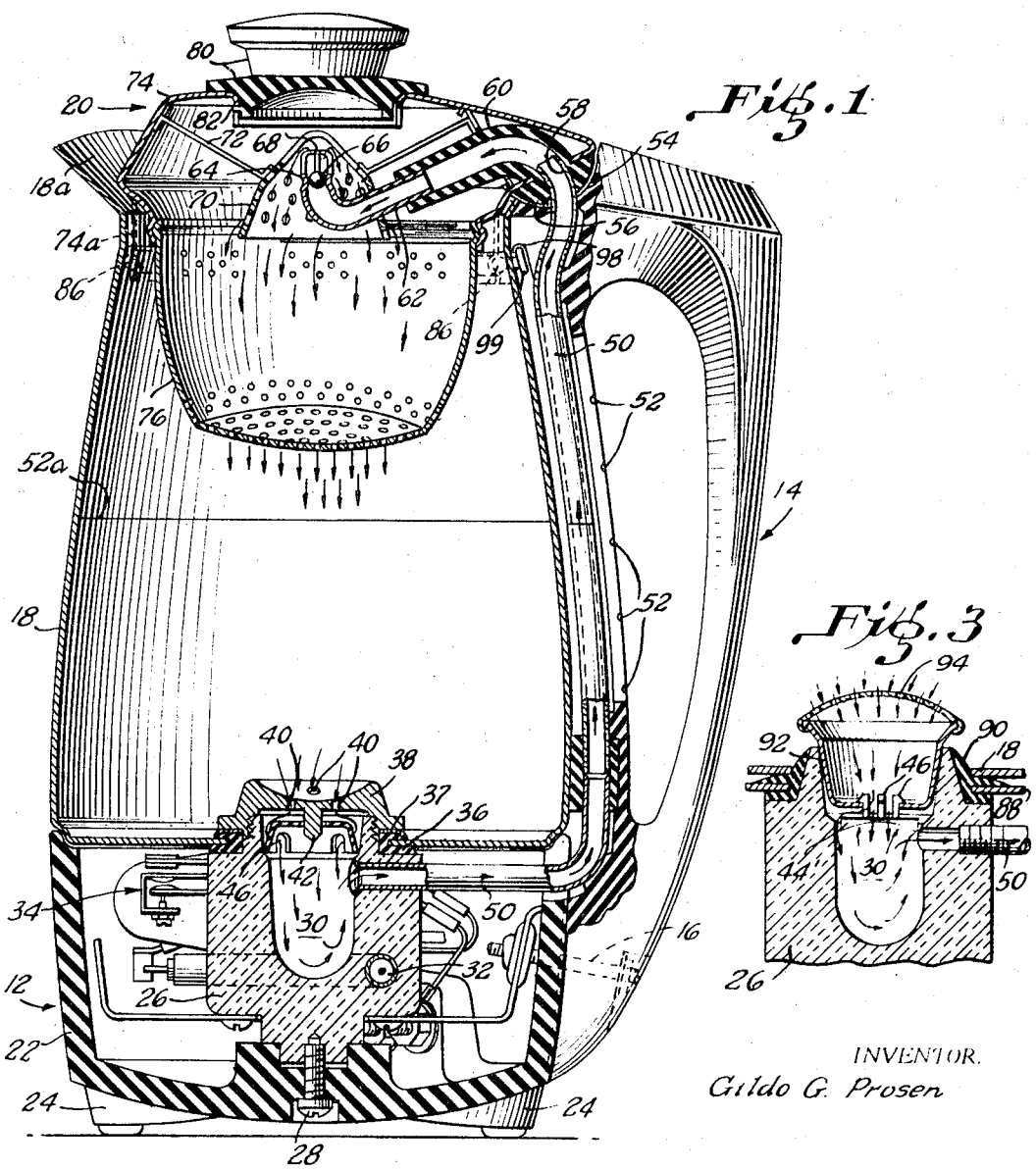
Fig. 1
Fig. 3
INVENTOR.
Gildo G. Prosen United States Patent Office  
3,469,522  
Patented Sept. 30, 1969

3,469,522  
DEVICE FOR BREWING BEVERAGE  
Gildo G. Prosen, 5356 N. Washtenaw Ave.,  
Chicago, Ill. 60625  
Filed Feb. 16, 1967, Ser. No. 616,568  
Int. Cl. A47j 31/00  
U.S. Cl. 99—308                                11 Claims

ABSTRACT OF THE DISCLOSURE

A percolator including a bowl open at the top and having a bottom port with a pump and a conduit extending from the bottom port to the open top and bypassing the bowl for circulating hot water from the bottom outlet, through the top opening and into a removably mounted cover assembly including a brewing basket and a hood for directing water into the basket. The pump includes a vertically sliding inverted cup-shaped valve member and a water heating chamber below the valve member, and a check valve can be provided at the conduit outlet.

BACKGROUND OF INVENTION

Field of invention

This invention relates to devices for brewing beverages such as coffee and more particularly relates to such devices of the percolator type.

Description of the prior art

Conventionally, percolators have included a heatable bowl having a lid and having an internal structure including a basket for containing brewing ingredients and supported by a central tube for conducting hot water upwardly into the basket. The percolator bowl may have a valve arrangement at the bottom thereof where the supporting central tube rests for assuring more direct delivery of water through the tube.

SUMMARY OF THE INVENTION

The present invention provides a simply constructed beverage brewing device which works on the percolator principle and includes a bypass conduit extending from an opening in the bottom of the percolator bowl upwardly to a cartridge or basket for holding brewing ingredients adjacent the top of the percolator.

While the present invention is susceptible of embodiment in many different forms, there is shown in the drawings and will herein be described in detail a preferred embodiment of the invention, together with modifications thereof, with the understanding that the present disclosure is to be considered as an exemplification of the principles of the invention and is not intended to limit the invention to the embodiment illustrated.

In the preferred form, the basket is releasably secured to a covering casing for the percolator bowl and constitutes a portion of a cover assembly which also includes a cover casing having a top opening and a lid for the top opening. The cover assembly is removably mounted as a combination cover and insert for the bowl, and at the removable mounting there is provided a plug for extending the bypass conduit from about the top lip of the bowl to a position overlying the brewing basket where the conduit extension terminates in an upward direction. Also in the preferred form a check valve is provided in the upward terminating portion of the extension to block backflow of fluid, and a hood is provided as a portion of the cover assembly for directing water from the outlet downward through the basket.

BRIEF DESCRIPTION OF THE DRAWING

FIG. 1 is a fragmentary vertical section through an embodiment of the brewing device of this invention;

FIG. 2 is a fragmentary top plan view of the device of FIG. 1; and

FIG. 3 is a fragmentary vertical section through a modified form of pumping valve for use in the device of FIG. 1.

DESCRIPTION OF THE PREFERRED EMBODIMENT

Turning to FIGS. 1 and 2 of the drawings, the illustrated device is in the form of a percolator having a base 12 with an upstanding handle 14 secured to the base by suitable bolt means at 16. Supported on the base 12 is a glass or metal bowl 18 which has a removable cover assembly 20 releasably attached to the upper end of the handle 14, as will be described in more detail hereinbelow.

Base 12 includes a heat-resistant plastic casing 22 having legs 24 for supporting the percolator. A heat-resistant block 26 is mounted in and secured to casing 22 by a suitable bolt at 28. Block 26 is of cup shape having an interior chamber 30 which functions as a pumping chamber, as will be described hereinbelow. Embedded in block 26 is an electric heating element 32 which generally surrounds chamber 30 for heating water in chamber 30. Heating element 32 is supplied with current by suitable conventional means, i.e. from a wall plug line, and is controlled by a suitable conventional thermostatic control as shown at 34.

Block 26 projects upwardly at a narrowed neck portion through an opening in the bottom wall of bowl 18 so that bowl 18 can be supported from a shoulder of block 26. A sealing grommet 36 and washer 37 surround the neck portion of block 26 at the opening through bowl 18 to provide a tight seal. The neck portion of block 26 is threaded and receives a screw cap 38 which is tightened against washer 37 to deform grommet 36 for sealing the opening. Screw cap 38 forms part of a lower valve assembly and includes a plurality of ports 40 through the upper wall thereof and has a centrally depending guide projection 42 which impales and slidably receives an inverted cup-shaped floating valve member 44 in an upper widened portion of chamber 30. Valving member 44 has valve ports in the form of notches 46 extending into the wall of the valving member from the lip thereof. The valving member 44 normally rests with its lip on the internal shoulder in chamber 30 where chamber 30 widens upwardly.

In operation of the lower valve assembly, with valve member 44 in its down position water enters chamber 30 through ports 40 and 46 and is heated to a mixture of water and vapor. The heat of expansion within the chamber 30 forces valving member 44 upwardly to close ports 40, and continued expansion causes the fluid mixture to expand from chamber 30 and upwardly through a tube 50 which bypasses bowl 18 during its upward extent. Tube 50 is shown as extending through structure spanning the ends of handle 14, although it can alternately extend through the more peripheral gripping portion of handle 14; in the latter instant, handle 14 should be made of or covered with suitable heat-insulating material. This relieves the pressure within chamber 30 so that valving member 44 falls to admit more water through ports 40 and 46. The newly admitted water is heated for expansion to repeat the pumping cycle, and hot water is pumped upwardly through tube 50. Preferably, tube 50 is transparent, e.g. of glass, over at least a portion of its upward extent, and level markers are provided as shown at 52 so that the tube also functions as a water level gauge when the pumping assembly is not functioning. The glass portion of tube 50 can be connected to a stainless steel tube portion using a suitable sealing sleeve at the tube joint.

Turning now to the cover assembly 20, the upper end of tube 50 projects from a concave socket 54, which socket is molded in the upper portion of handle 14. The cover assembly 20 includes a shaped plug 56 which is releasably received in socket 54 and which has a central port 58 for tightly receiving the upper end of tube 50. Plug member 56 also has a lateral conduit 60 which receives a tubular extension member 62 having an upwardly directed end portion for delivering hot water to a position above the brewing ingredients. A check valve 66 may be provided at the outer end of tube 62 for increasing the effective pumping action through tube 50. This would reduce the brewing time for the beverage. The tubular check valve assembly includes a laterally directed portion and an upwardly directed portion with the upwardly directed portion having a shoulder at 64 for suporting a ball check valve member 66 thereabove. The end portion of the tubular member 62 terminates beyond the shoulder 64 at a narrowed split basket-like outlet orifice 68 through which ball member 66 cannot pass but through which fluid can pass.

A hood 70 covers and surrounds outlet 68 for directing fluid from outlet 68 downwardly. The lower extremities of hood 70 have openings therein through which fluid from the outlet 68 can disperse. Hood 70 is secured by suitable struts 72 to cover casing 74 of cover assembly 20. Casing 74 also supports the shaped plug 56 providing a cover assembly which can be removably secured to the handle and bowl combination by means of the plug and socket 56, 54 and contact around the top edge of the bowl and cover 20. The casing 74 is of sufficient extent to cover the top opening in bowl 18 with the exception of a pouring spout portion 18a.

A foraminous brewing ingredient cartridge in the form of a basket 76 is provided for containing the coffee and is removably secured to and depends from casing 74 in cover 20. The basket 76 is illustrated as being connected with casing 74 by a threaded connection, although snap-fit or spring-clip connections can alternatively be used with advantage. Casing 74 has a central fill opening which receives a lid 80. Lid 80 and the walls of the fill opening in casing 74 are provided with a key and keyway arrangement as at 82 so that a quarter rotation of lid 80 relative to casing 74 will lock lid 80 to casing 74.

As an advantageous modification, the device can be readily adapted for pressure or vacuum operation by providing means for sealing cover assembly 20 to bowl 18. Accordingly, as shown in phantom in FIG. 1, a depending skirt 74a can be provided as part of casing 74, with skirt 74a having a peripheral groove containing a sealing O-ring 86 for engaging and sealing against the inner wall of bowl 18. When the device is built with the seal arrangement of 74a and 86, it is necesary to include a one-way preset pressure relief valve in cover 80 to prevent excess build-up of pressure in the bowl. The cover 20 can be hinged to the handle by appropriate hinging means such that the cover could be pivoted upwardly and to the right in FIG. 1 for cleaning and filling.

In order to use the device as a coffee maker, lid 80 is removed after first unturning it the quarter turn to unlock. The bowl is filled to a predetermined proper level such as indicated by the line 52a by introducing water through the fill opening provided by removed lid 80. Coffee grounds are then introduced through the fill opening into basket 76 and lid 80 is replaced and locked. The device is then plugged in and the heating element 32 starts the pumping action up tube 50. The hot water emitted from outlet 68 is directed downwardly through the brewing basket 76 by hood 70 for brewing the coffee. The check valve ball 66 helps in the pumping action by preventing undue back-flow of liquid through tube 50. Once the brewing is completed and the thermostatic switch 34 readjusts the temperature provided by heating element 32, the flow of hot water from outlet 68 ceases. It is believed to be now apparent that the cover 20 can be removed, water poured into the bowl, coffee added into the removable basket 76 and the cover 20 replaced as another way of making a brew.

In order to disassemble the device for cleaning, it is merely necessary to pull lid 80 without first unlocking the lid, thereby unplugging the cover assembly 20 from the handle 14 at 54, 56. The cover assembly can then be disassembled by removing basket 76 for disposal of the grounds and for complete cleaning of all component parts.

When more thorough cleaning of the percolator is required, cap 38 can be unthreaded from plug 56 and bowl 18 and valving member 44 can be removed for access to chamber 30. All parts can then be cleaned as needed and reassembled.

Turning now to the modification in the lower pumping valve assembly as shown in FIG. 3, in this form the bottom casing 22 is modified to include a top wall 88 secured across the top opening of the casing 22 and spaced slightly below the bottom of bowl 18. Wall 88 is preferably peripherally sealed adjacent the lips of the casing 22. A molded seal 90 of rubber or other deformable resilient material seals wall 88 to a shoulder portion of block 26 and the seal 90 extends above wall 88. In this form the bowl 18 can be rested with its central bottom opening on and sealed by seal 90; the top of bowl 18 is tightly secured to the top portion of handle 14 by means of the hook 98 in the handle and the latch 99 carried by the top edge of the bowl 18 or by other suitable means to press and seal the bottom wall opening against the seal 90.

Also in the form shown in FIG. 3, the bottom valve assembly includes a tapered cup 92 which functions as a plug for the upper widened portion of chamber 30 and which includes a foraminous cover 94 for admitting water to the cup. The cup 92 includes a bottom wall aperture 96 into which is snapped the resilient tabs 97 on the floating valve member 44'. That is, the valve 44' has three upstanding tabs 97, each with an outwardly directed cam-shaped projection such that when the tabs 97 are urged upwardly through the aperture 96, the valve 44' will be operatively connected to the cup 92 and will be free to oscillate up and down relative to the cup 92. In the up position of valve 44', it will seal the opening 96, and in the down position, fluid can flow between the inside of cup 92 and the heating chamber 30. Valve 44' is made of molded Teflon or other plastic material. It will readily be seen that the pumping action provided by this arrangement is similar to that provided by the form in FIG. 1. In the form of device of FIG. 3 it is not necessary to first remove portions of the pumping assembly in order to remove bowl 18 for cleaning.

I claim:

1. A device for brewing beverage which comprises a container for containing a supply of brewing water for brewing a batch of beverage and for containing the brewed batch of beverage, said container having a top opening and a bottom opening, check valve means at said bottom opening for permitting flow of water from the container therethrough and for checking back-flow, means defining a chamber for receiving water from the container through the check valve, means for heating water in said chamber, conduit means extending from said chamber and including separate standpipe means bypassing said container and extending upwardly for delivery of water from said chamber to the container at a position adjacent the top of the container whereby heating of water in said chamber causes expansion through said conduit to deliver water to said position while said check valve prevents back-flow of water from said chamber to said container, and foraminous means adjacent the top of said container for holding brewing ingredients and for receiving water from said position.

2. The device of claim 1 comprising a top assembly including a cover for said container and including said foraminous means secured to said cover and wherein said position is between said cover and said foraminous means.

3. The device of claim 2 wherein said foraminous means is releasably secured to said cover.

4. The device of claim 2 including a central top fill opening in said cover, a lid for said fill opening, and locking means for releasably locking said lid on said fill opening.

5. The device of claim 2 wherein said top assembly includes means for removably sealing said top assembly in the top of said container to close said container.

6. The device of claim 1 wherein said conduit includes second check valve means adjacent said position.

7. The device of claim 1 wherein said check valve means and said chamber comprise a bottom pumping valve assembly in which the valve member of said check valve is a floating inverted cup mounted for vertical movement between an upper position and a lower position having an imperforate bottom wall and a ported side wall and said valve assembly includes a ported member spanning the container bottom opening above said valve member and facially engageable by the bottom wall of said valve member for closing the ports thereof with said valve member in its upper position.

8. The device of claim 1 including a base member and a handle upstanding from said base member and in which said conduit means is secured to said base and handle.

9. The device of claim 8 wherein said conduit means extends laterally from said chamber through said base member, thence upwardly at said handle.

10. A device for brewing beverage which comprises a container for brewed beverage, a handle, a top assembly including a cover for covering said container and a foraminous receptacle for containing brewing ingredients, means pivotally mounting said top assembly to said handle for covering said container, a conduit extending from the bottom of said container to said receptacle without passing through said container and a disconnect means between said cover and said handle for disconnecting said conduit when said cover is opened.

11. A device for brewing beverage which comprises a container for containing a supply of brewing water for brewing a batch of beverage and for containing the brewed batch of beverage, said container having a top opening, check valve means at said bottom opening for permitting flow of water from the container therethrough and for checking back-flow, means defining a chamber for receiving water from the container through the check valve, means for heating water in said chamber, conduit means extending from said chamber and including separate standpipe means bypassing said container and extending upwardly for delivery of water from said chamber to the container at a position adjacent the top of the contained whereby heating of water in said chamber causes expansion through said conduit to deliver water to said position while said check valve prevents back-flow of water from said chamber to said container, foraminous means adjacent the top of said container for holding brewing ingredients and for receiving water from said position, and a top assembly including a cover for said container and including said foraminous means secured to said cover and wherein said position is between said cover and said foraminous means, said conduit means is secured to said top assembly and directs water upwardly at said position and including a hood mounted in said top assembly over the outlet end of said conduit means means for redirecting water therefrom downwardly through said foraminous means.

References Cited
UNITED STATES PATENTS

| | | | |
|---|---|---|---|
| Re. 17,077 | 9/1928 | Pouget | 99—307 |
| 433,673 | 8/1890 | Colby | 99—307 |
| 2,065,211 | 12/1936 | Carvalho | 99—307 |
| 2,455,660 | 12/1948 | Dunlop | 99—308 |
| 3,270,659 | 9/1966 | Tavera | 99—308 X |

ROBERT W. JENKINS, Primary Examiner

U.S. Cl. X.R.

99—281